(12) United States Patent
Moore et al.

(10) Patent No.: US 7,783,105 B2
(45) Date of Patent: Aug. 24, 2010

(54) METHOD AND SYSTEM FOR DIGITALLY SCALING A GAMMA CURVE

(75) Inventors: Bruce C. Moore, Glendale, AZ (US); Mark D. Kuhns, Peoria, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 1113 days.

(21) Appl. No.: 11/449,222

(22) Filed: Jun. 7, 2006

(65) Prior Publication Data
US 2007/0285576 A1   Dec. 13, 2007

(51) Int. Cl.
*G06K 9/00* (2006.01)
(52) U.S. Cl. ........................ 382/167; 382/162
(58) Field of Classification Search .......... 382/162, 382/163, 166, 167, 168; 345/600, 581, 589; 348/184, 708, E5.074, 674; 219/661
See application file for complete search history.

(56) References Cited

U.S. PATENT DOCUMENTS

| | | | | |
|---|---|---|---|---|
| 3,612,805 A | * | 10/1971 | Kennedy | ............... 219/661 |
| 5,754,222 A | * | 5/1998 | Daly et al. | ............... 348/184 |
| 7,515,160 B2 | * | 4/2009 | Kerofsky | ............... 345/600 |
| 2004/0057061 A1 | | 3/2004 | Bochkarev | |
| 2004/0246537 A1 | | 12/2004 | Ohyama et al. | |

FOREIGN PATENT DOCUMENTS

| | | | |
|---|---|---|---|
| JP | 2003304398 A | 10/2003 | |
| KR | 102004077353 A | 9/2004 | |

* cited by examiner

*Primary Examiner*—Anh Hong Do

(57) ABSTRACT

A method and system for digitally scaling a waveform. A method is described performing a linear waveform transformation and translation of a curve in a smooth and continuous fashion. Another method is described for scaling a waveform in which the available accuracy and resolution is manipulated for a given waveform. Specifically, by strategically placing virtual tap points of a waveform, as well as changing the scaling factors used for calculating points on the waveform provides for adjusting the accuracy and resolution in one or more regions of a waveform. These scaling methods provide a digital equivalent of a voltage tap-based analog resistor ladder used for digital-to-analog conversion. The digital virtual tap points represent the analog voltage tap points, and the vertical translation of the curve acts in a smooth, monotonic, and continuous fashion.

24 Claims, 9 Drawing Sheets

METHOD AND SYSTEM FOR DIGITALLY SCALING A GAMMA CURVE

BACKGROUND OF THE INVENTION

1. Field of the Invention

Embodiments of the present invention relate to the field of gamma correction. More particularly, embodiments of the present invention relate generally to the digital enhancement and implementation of gamma curves for a display.

2. Related Art

Liquid crystal displays (LCDs) are important to the television market. However, pushing LCDs to the next generation by simply scaling existing LCD monitor panels to wider formats (e.g., 16:9 HDTV) and larger formats is a complicated endeavor. A number of television requirements push beyond conventional state-of-the art monitors. For instance, contrast enhancement issues require a re-engineering of the monitor solution.

In particular, gamma correction enhances the display of color. Specifically gamma correction is performed to compensate for the nonlinear effects of the intensity distribution and interrelationship of contrast between light and dark regions of a display device, and the nonlinear processing of the color in the human eye. For instance, the grayscale distribution of the intensity of a color is linear, which can be translated to voltage signals for a display device. However, the luminance of a display device is generally not a linear function of the applied voltage signal. As such, a linear translation of the luminance codes will fail to correctly reproduce the brightness variations in the displayed digital image.

In conventional systems, gamma correction is performed in an analog contrast enhancement block of a display device. The contrast enhancement block manipulates the analog tap voltages of the resistor string in order to shape a gamma curve that provides contrast enhancement. However, the analog manipulation of voltages is not appropriate in modern digital display systems.

SUMMARY OF THE INVENTION

Accordingly, various embodiments of the present invention disclose a method and system for digitally scaling a gamma curve in a linear and ratiometric fashion. Embodiments of the present invention are capable of generating a resulting gamma curve that is smooth and continuous throughout thereby avoiding any visual artifacts in a display (e.g., any liquid crystal display). Still other embodiments of the present invention are capable of digitally generating a resulting gamma curve that increases in a monotonic fashion. As such each successive value of luminance codes in the resulting gamma curve results in a unique and ever increasing voltage. In addition, other embodiments provide for a resulting gamma curve, that only reflects the desired vertical translation of the original gamma curve.

Specifically, in one embodiment a method is described for digitally adjusting a gamma curve. In the method, a region is defined between two tap points for an original gamma curve. The tap points are associated with a plurality of virtual tap points corresponding to fixed luminance codes in an original gamma curve. Gamma values for each of the plurality of virtual tap points are adjusted to generate a modified gamma curve that provides for contrast enhancement. For a luminance code in the region, a linear scaling factor is determined based on a linear representation of the original gamma curve in the region. A gamma value offset is determined for the luminance code by applying the linear scaling factor to a linear representation of a modified gamma curve in the region. The modified gamma curve performs contrast enhancement. An adjusted gamma value associated with the modified gamma curve is determined for the luminance code based on the gamma value offset.

In another embodiment, a system for digitally adjusting a gamma curve is described. The system comprises a scaling module and a storing module. The scaling module determines a plurality of linear ratiometric scaling factors for luminance codes in a region between tap points of an original gamma curve. The original gamma curve comprises a plurality of virtual tap points. Each of the ratiometric scaling factors is generated by ratiometrically scaling a slope of a linear representation of the region for a corresponding luminance code in the region. A storage module stores the plurality of linear ratiometric scaling factors. The scaling factors are used in determining adjusted gamma values for a modified gamma curve for each of the luminance codes in the region.

Embodiments of the present invention provide for a digital equivalent of a voltage tap-based analog resistor ladder used for digital-to-analog conversions.

Specifically, the digital virtual tap points take the place of the actual analog voltage tap points. As such, the vertical translation of an original gamma curve acts in a smooth, monotonic, and continuous fashion.

DETAILED DESCRIPTION OF THE INVENTION

Figure 1:
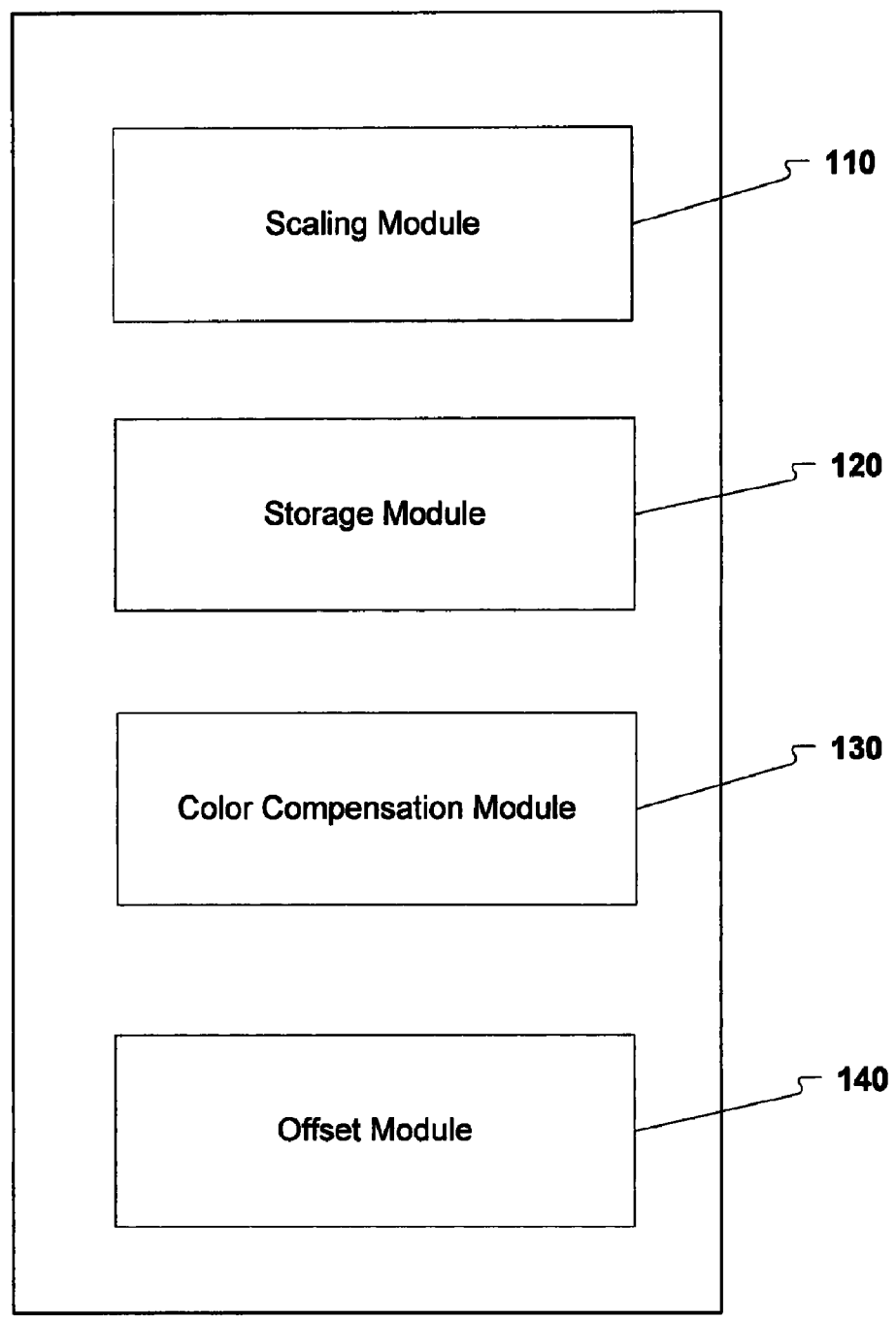
FIG. 1 is a block diagram of a system capable of digitally scaling a gamma curve in a linear and ratiometric fashion, in accordance with one embodiment of the presently claimed invention.

Reference will now be made in detail to the preferred embodiments of the present invention, a method and system for linear and ratiometric scaling of a gamma curve, examples of which are illustrated in the accompanying drawings.

Accordingly, various embodiments of the present invention disclose a method and system for scaling a gamma curve in a linear and ratiometric fashion. Embodiments of the present invention achieve the above accomplishments, and are capable of allowing the translation of an original gamma curve to a modified gamma curve that is enhanced for some purpose such as contrast enhancement in a smooth, continuous, and monotonic fashion through the use of a linear ratiometric scaling calculation.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Notation and Nomenclature

Embodiments of the present invention can be implemented on hardware or software running on a computer system in conjunction with an optical imaging system. The computer system can be a personal computer, notebook computer, server computer, mainframe, networked computer, workstation, and the like. This software program is operable for providing gamma correction. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "setting," "scaling," "adding," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 5:
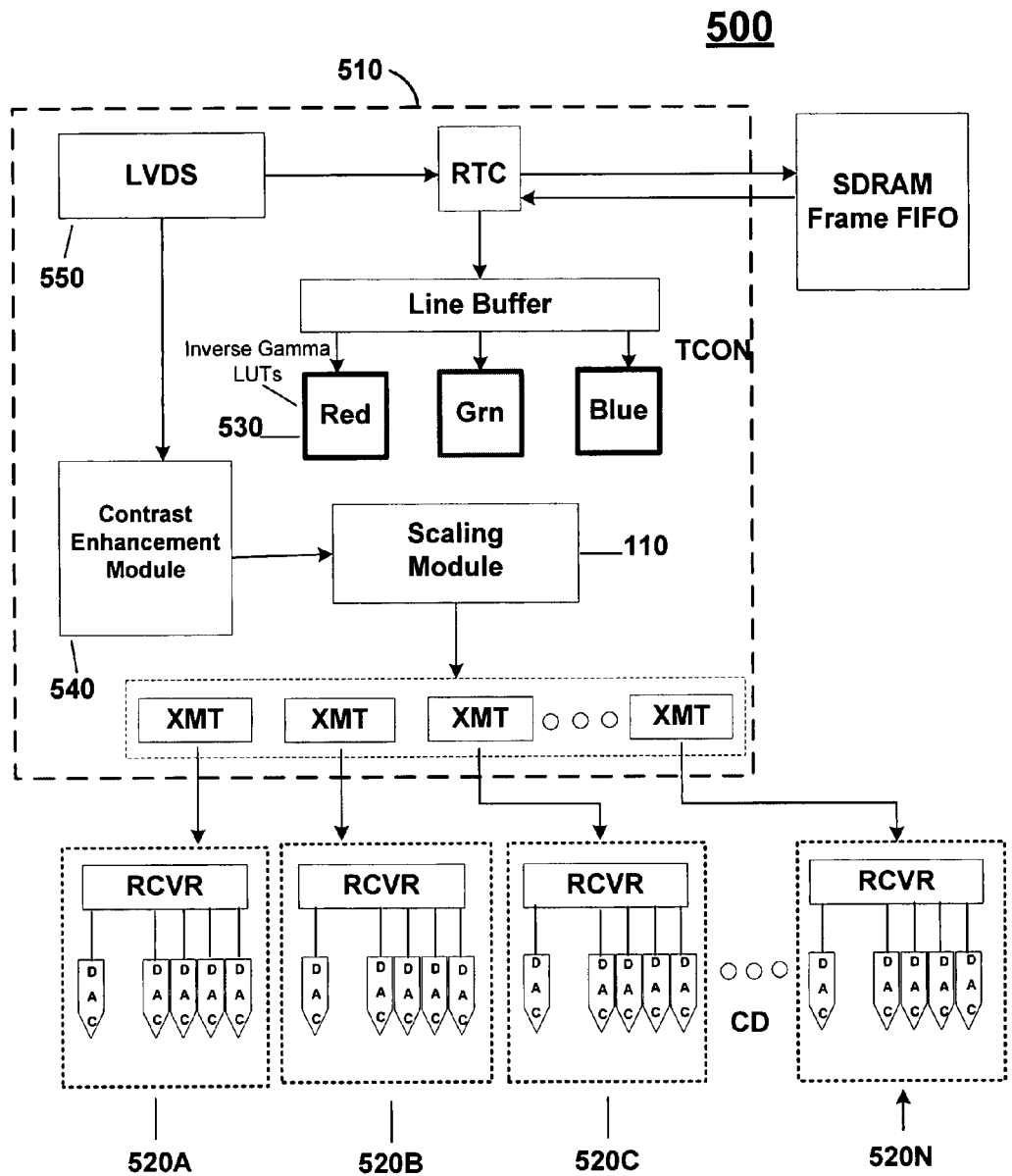
FIG. 5 is a diagram illustrating a timing controller capable of digitally scaling a gamma curve in a linear and ratiometric fashion to determine an adjusted gamma value for a given luminance code, in accordance with one embodiment of the present invention.

Some embodiments of the present invention are implemented within a point-to-point differential signaling (PPDS™) system for communication within a television or high-end monitor. FIG. 5 is a diagram illustrating the PPDS™ architecture 500. The PPDS™ architecture 500 comprises a timing controller 510 and a plurality of column drivers 520A through 520N.

The PPDS™ data signaling architecture 500 provides a single channel, direct point-to-point link between the timing controller 510 and each column driver 520A-N of a display device. In one embodiment, PPDS™ is a system of separate, point-to-point links, wherein a single channel is associated with a column driver. This channel carries column-driver control information and digital voltage values that are converted to into analog by the column driver. In the PPDS™ system, all the column drivers simultaneously receive their data, in one embodiment. As such, even if there is a single differential channel supplying each column driver with data, the channel is used continuously.

Each of the column drivers 520A-N of FIG. 5 uses a linear, cyclic digital-to-analog converter (DAC), in accordance with one embodiment of the present invention. As such, unlike the conventional R-DAC configurations whose non-linear transfer characteristic is hardwired into a resistor ladder, the DAC of the present invention is linear over its dynamic range. This allows the inverse gamma function to be decoupled from the DAC and placed in the digital look-up tables (LUTs) (e.g., the red LUT 530) in the timing controller, upstream from the column driver. With this architecture, embodiments of the present invention provide 10 bit or higher grayscale precision without adversely affecting the die size. For example, the die size of a typical 10 bit PPDS™ column driver is less than half the die size of a comparable 8 bit R-DAC column driver.

As shown in FIG. 5, the inverse gamma function is decoupled from the DAC circuit, in one embodiment of the present invention. This means that each column driver output directly converts digital voltage values into analog voltage values. The conversion from digital gray levels to digital voltages takes place upstream in the timing controller. In other words, the inverse gamma function is provided in an LUT resident (e.g., red LUT 530) on the timing controller 510. This provides great flexibility in mapping each gray level to brightness on the display device. As such, a separate LUT for each color is possible, in one embodiment. Also, real-time updates to accommodate different image sources, contrast expansion, color management, and temperature changes are possible in embodiments of the present invention.

In addition, the timing controller comprises a contrast enhancement module 540, in one embodiment. The contrast enhancement module 540 takes luminance data from the low voltage differential signaling (LVDS) module 550. The luminance data was originally captured from an image source (not shown). The contrast enhancement module 540 performs statistical analysis on the luminance data on a frame by frame basis for determining the proper enhancement of gamma values associated with luminance values suitable for the corresponding display device. For example, the contrast enhancement module provides the modified virtual tap points defining a modified gamma curve that is based from an original gamma curve.

The output of the contrast enhancement module is presented to the scaling module 110. The scaling module 110 digitally scales the original gamma curve in a linear and ratiometric fashion to generate the modified gamma curve, as will be more fully described below in relation to FIG. 1.

Linear Waveform Transformation

FIG. 1 is a block diagram of a digital gamma curve interpolator 100 capable of digitally scaling a gamma curve in a linear and ratiometric fashion, in accordance with one embodiment of the presently claimed invention. The digital gamma curve interpolator 100 is capable of modifying an original gamma curve for contrast enhancement when displaying images on a display device. In one embodiment, the digital gamma curve interpolator 100 is implemented within the timing controller 510 of FIG. 5.

The digital gamma curve interpolator 100 comprises a scaling module 110 for ratiometrically scaling an original gamma curve such that gamma values for a modified gamma curve used for contrast enhancement can be generated. The original gamma curve comprises a plurality of defined virtual tap points that are gamma values on the original gamma curve. That is, the original gamma curve necessarily goes through the virtual tap points. As such, a voltage output for a luminance code is presented to a display as implemented by the gamma curve.

In particular, the scaling module 110 determines a plurality of linear ratiometric scaling factors that is associated with a plurality of luminance codes in a region between virtual tap points. Each of the ratiometric scaling factors for a corresponding luminance code is determined by scaling a slope of a linear representation of a region of an original gamma curve between virtual tap points of an original gamma curve, as will be described more fully below in relation to FIGS. 2, 3, 4A, and 4B.

In one embodiment, the digital gamma curve interpolator 100 comprises a tap point locator (not shown) that sets the plurality of virtual tap points in an equidistant configuration. That is, the number of luminance codes between virtual tap points is constant. In another embodiment, the tap point locator sets the plurality of virtual points in a non-equidistant configuration. That is, the number of luminance codes between virtual tap points is not constant.

In addition, the digital gamma curve interpolator 100 comprises a storage module 120. The storage module 120 stores the plurality of ratiometric scaling factors in the region. A ratiometric scaling factor for a particular luminance code is used to determine a modified gamma value associated with a modified gamma curve used for contrast enhancement.

Also, the digital gamma curve interpolator 100 comprises a contrast compensation module 130 for determining modified tap points for each of the defined virtual tap points of a modified gamma curve that performs contrast enhancement. In embodiments of the present invention, various techniques can be used to determine the adjusted gamma values of the modified tap points for the defined virtual tap points. As such, the modified gamma curve includes the adjusted gamma values for each of the defined virtual tap points. That is, modified gamma curve is defined by the modified tap points that are translations of the virtual tap points in the original gamma curve.

The digital gamma curve interpolator 100 also comprises an offset module 140 for determining gamma values throughout the modified gamma curve using the modified tap points translated from the defined virtual tap points obtained by the contrast compensation module 130. In particular, the offset module 140 is able to determine a gamma value offset for each luminance code in the region defined between two modified tap points. The gamma value offset for a particular luminance code is determined by applying a corresponding linear scaling factor to a linear representation of the modified gamma curve including and between two virtual tap points.

In addition, the offset module 140 determines an adjusted gamma value for the luminance code based on the gamma value offset previously determined. In particular, the offset module 140 offsets the previously determined modified tap point of one of the virtual tap points by the gamma value offset.

Figure 2:
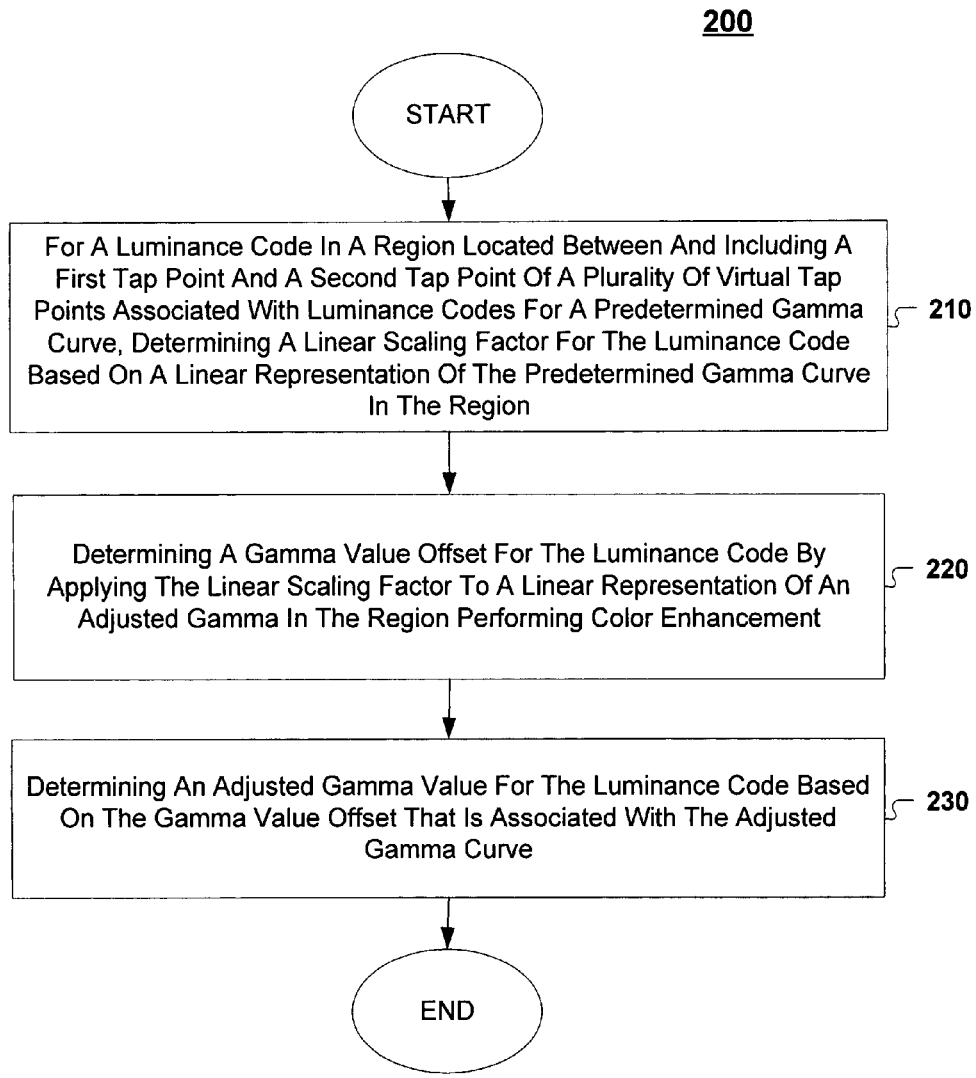
FIG. 2 is a flowchart illustrating steps in a method for digitally scaling a gamma curve in a linear and ratiometric fashion to determine an adjusted gamma value for a given luminance code, in accordance with one embodiment of the present invention.
Figure 4A:
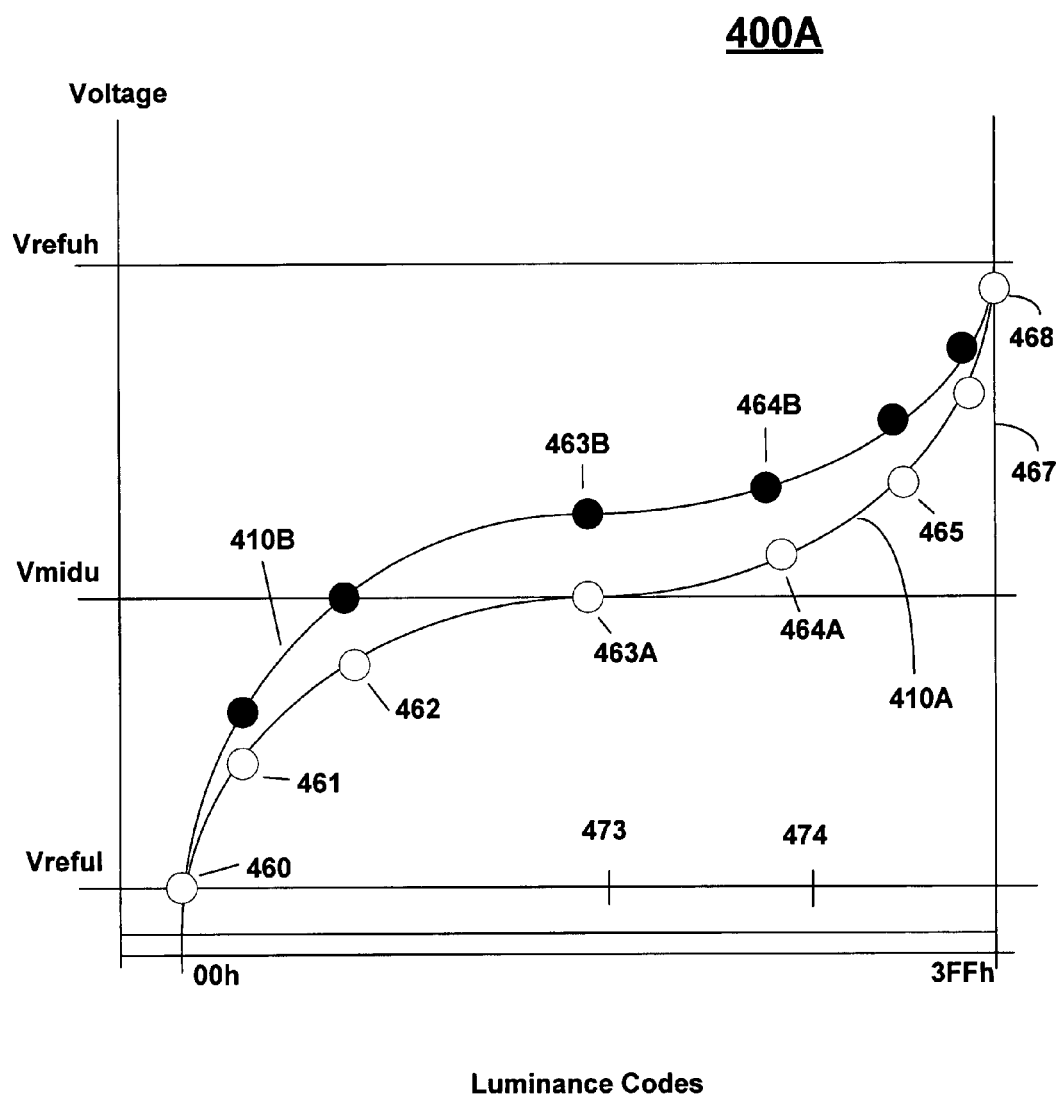
FIG. 4A is a diagram illustrating an original gamma curve and a modified gamma curve generated by the methods of FIGS. 2 and 3, in accordance with one embodiment of the present invention.
Figure 4B:
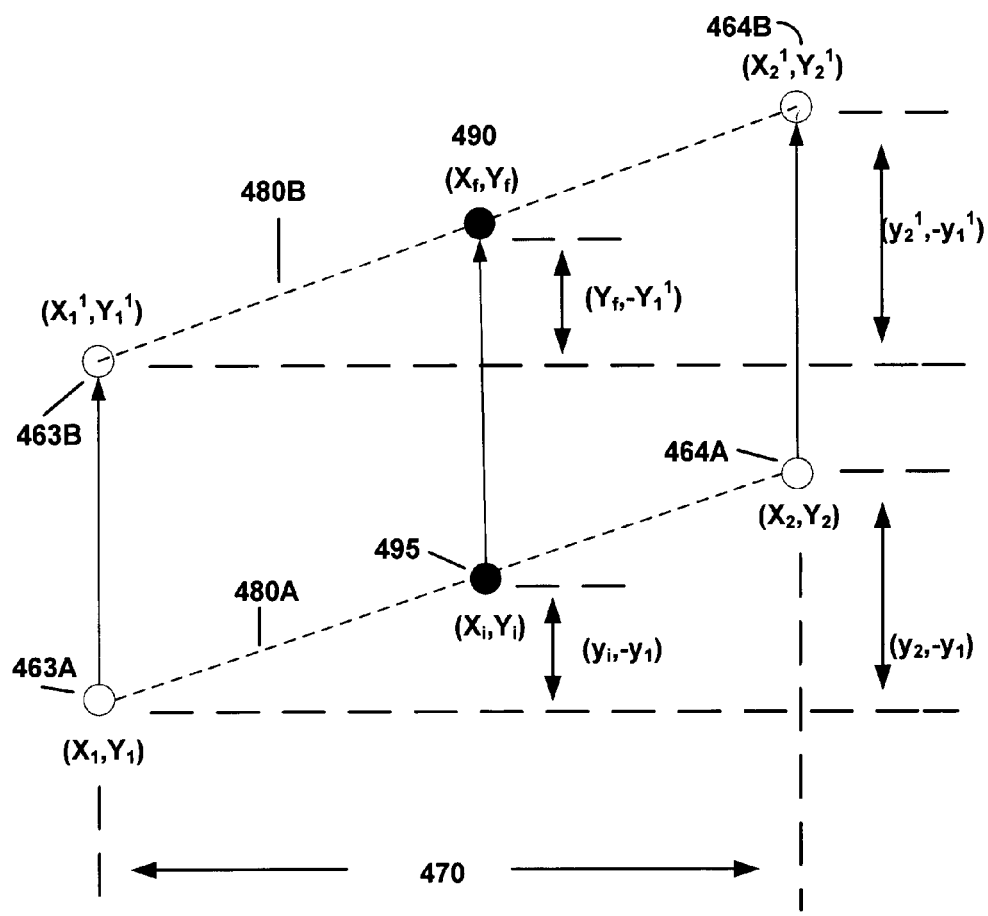
FIG. 4B is a diagram illustrating the linear and ratiometric scaling of the original gamma curve of FIG. 4A between two virtual tap points, in accordance with one embodiment of the present invention.

FIG. 2 in combination with FIGS. 4A and 4B illustrate a method for determining gamma values in a modified gamma curve performing contrast enhancement. In particular, FIG. 2 is a flow diagram 200 illustrating steps in a method for digitally scaling a gamma curve in a linear and ratiometric fashion to determine an adjusted gamma value for a given luminance code, in accordance with one embodiment of the present invention. FIGS. 4A and 4B provide illustrations for determining an adjusted gamma value between two defined tap points.

Turning now to FIG. 2, a method for linearly and ratiometrically determining an adjusted gamma value for a given luminance code is described, in accordance with one embodiment of the present invention. In one embodiment, the digital gamma curve interpolator 100 of FIG. 1 is able to implement the method outlined in FIG. 2.

At 210, the scanning module 110 determines a linear scaling factor for a luminance code. The luminance code is located in a region between and including two tap points, a first virtual tap point and a second virtual tap point. The linear scaling factor for the luminance code is based on a linear representation of the original gamma curve in the region.

The tap points defining the region are included within a plurality of virtual tap points that are gamma values associated with luminance codes for an original gamma curve. The plurality of virtual tap points is an arbitrary number of points that necessarily lie on the original gamma curve, spaced apart in an arbitrary and programmable fashion, in one embodiment.

For example, FIG. 4A is a diagram illustrating an original gamma curve 410A and a modified gamma curve 410B generated by the method of FIG. 2, in accordance with one embodiment of the present invention. Along the horizontal axis, luminance codes are designated from 00h to 3FFh, as an example. Along the vertical axis, voltages are designated. As such, the original gamma curve 410A provides voltages for a given luminance code. That is, the original gamma curve 410A nonlinearly provides a voltage for a corresponding display device for a plurality of luminance codes in a gray scale representation of one or more colors.

In FIG. 4A, a plurality of virtual tap points is shown for the original gamma curve 410A. For instance, the plurality of virtual tap points includes, but is not limited to, tap points 460, 461, 462, 463, 464, 465, 467, and 468. As shown in FIG. 4A, eight regions are defined between the nine virtual tap points 460-468, in the present embodiment. Other embodiments are well-suited to defining more or less than nine virtual tap points. Each of the virtual tap points is associated with a corresponding gamma value on the original gamma curve 410A. For example, the virtual tap point 463A on the original gamma curve 410A is associated with luminance code 473. Also, the virtual tap point 464A on the original gamma curve 410A is associated with luminance code 474.

The plurality of virtual tap points is used to manipulate the shape of the original gamma curve 410A by translating each of the virtual tap points up or down in a digital representation of the voltage associated with a given value of luminance code, in accordance with one embodiment of the present invention. For instance, the modified tap point 463B is translated from virtual tap point 463A. In addition, the modified tap point 464B is translated from virtual tap point 464A. As such, the resulting modified gamma curve 410B goes through the translated and modified tap points of the modified gamma curve 410B.

Embodiments of the present invention are able to determine gamma values located on the modified gamma curve 410B, especially for luminance codes located between virtual tap points. Specifically, embodiments of the present invention performs linear ratiometric scaling to translate the voltage for each luminance code to its new, translated gamma value of a modified gamma curve in a way that maintains the shape of the modified gamma curve in a smooth, continuous, and monotonically increasing fashion.

At 220, the present embodiment determines a gamma value offset for the luminance code by applying the corresponding linear scaling factor to a linear representation of a modified gamma curve in the region. The modified gamma curve performs contrast enhancement. The determination of the gamma value offset is described more fully in relation to FIG. 4B.

At 230, the present embodiment determines an adjusted gamma value for the luminance code. The adjusted gamma value is based on the gamma value offset previously determined at 220. The adjusted gamma value is associated with the modified gamma curve. The determination of the adjusted gamma value is described more fully in relation to FIG. 4B.

FIG. 4B is a diagram illustrating the linear and ratiometric scaling of the original gamma curve 410A of FIG. 4A between two tap points, in accordance with one embodiment of the present invention. In particular, FIG. 4B illustrates the generation of linear scaling factors for each luminance code in a region 470 including and between the virtual tap points 463A and 464A of FIGS. 4A and 4B, as outlined at 210 of FIG. 2. In addition, FIG. 4B illustrates the generation of an adjusted gamma value associated with the modified gamma curve 410B for a particular luminance code in the region 470.

As such, using the linear scaling factors, adjusted gamma values associated with the modified gamma curve 410B are determined. For example, the adjusted gamma value ($y_f$) for the luminance code ($x_i$) is determined at point 490.

As shown in FIG. 4B, the derivation of the method outlined in FIG. 2 makes the following assumptions in the present embodiment: 9 virtual tap points, 12-bit gamma values, and the storing of gamma values using a 10-bit value in ratiometric form. Other embodiments are well suited to the use of other than nine virtual tap points. Still other embodiments envision the use of gamma values having more or less than 12 bits. Still other embodiments are well suited to the storing of gamma values using other than 10-bit values in ratiometric form.

As shown in FIG. 4B, linear representations of portions of the original gamma curve 410A and the modified gamma curve 410B are shown. For example, in region 470, the original gamma curve 410A is shown between virtual tap points 430A and 435A. Point 495 ($x_i$, $y_i$) is shown to be located on the linear representation 480A of the original gamma curve 410A. Also, in region 470, the modified gamma curve 410B is shown between modified, virtual tap points 463B and 464B. Point 490 ($x_f$, $y_f$) is shown to be located on the linear representation 480B of the modified gamma curve 410B.

Specifically, for the luminance code ($x_i$) in the region 470, the present embodiment ratiometrically scales a slope of the linear representation 480A in the region 470 to determine the associated linear ratiometric scaling factor. Specifically, as outlined at 210 of FIG. 2, a linear representation 480A of the original gamma curve 410A is determined between a first virtual tap point 463A associated with the luminance code 473 and a second virtual tap point 464A associated with the luminance code 474. That is, a linear line is drawn through point 463A ($x_1$, $y_1$) and point 464A ($x_2$, $y_2$), which are programmed tap points on the original gamma curve 410A to determine the slope. Equation 1 represents the line passing through the virtual tap points 463A and 464A for the region 470, as follows:

$$y_i = (y_2 - y_1)/(x_2 - x_1) * (x_i - x_1) + y_1 \quad (1)$$

Next, the present embodiment determines a linear representation 480B of the modified gamma curve 410B between a first modified tap point 463B and a second modified tap point 464B. Specifically, a linear representation 480B of the modified gamma curve 410B is determined between points 463B ($x_1'$, $y_1'$) and 464B ($x_2'$, $y_2'$), which are modified, virtual tap points. That is, the virtual tap points 463A and 464A are still associated with corresponding luminance codes; however, their gamma values are adjusted to the modified, virtual tap points. For instance, virtual tap point 463A is translated to modified, virtual tap point 463B. Also, virtual tap point 464A is translated to modified, virtual tap point 464B. Equation 2 represents the line passing through modified, virtual tap points 463B and 464B, as follows:

$$y_f = (y_2' - y_1')/(x_2' - x_1') * (x_f - x_1') + y_1' \quad (2)$$

Since $x_i = x_f$, $x_2 = x_2'$, and $x_1 = x_1'$, the present embodiment solves for x's giving the following in Equation 3:

$$(x_2' - x_1')/(x_f - x_1') = (x_2 - x_1)/(x_i - x_1) = (y_2 - y_1)/(y_i - y_1) = (y_2' - y_1')/(y_f - y_1') \quad (3)$$

Then, the present embodiment, for a given luminance code, applies the ratiometric scaling factor to a slope of the linear representation 480B of the modified gamma curve 410B in the region 470 to determine the gamma value offset 495. In other words, the present embodiment solves for $y_f$ as shown in Equation 4:

$$y_f = (y2' - y1')/(y2 - y1) * (yi - y1) + y1' \quad (4)$$

In the present embodiment, to avoid discontinuities, it is imperative that y values all come from the original gamma curve 410A, and y' values originate from the modified gamma curve 410B, as shown in Equation 5, as follows:

$$y_f = [(y_i - y_1)/(y_2 - y_1)] * (y_2' - y_1') + y_1' \quad (5)$$

As shown in the Equation 5, $(y_i - y_1)/(y_2 - y_1)$ is the linear ratiometric scaling factor. As such for the region 470, for any modified gamma curve, the linear ratiometric scaling factor can be predetermined since no values associated with the modified gamma curve are needed.

In one embodiment, to save hardware, and to increase the accuracy of the computation of the modified gamma values, the portion defined by $(y_i - y_1)/(y_2 - y_1)$ is pre-calculated for each gray level value, or luminance code, i, and programmed into the gamma curves. That is, for every luminance code, i, the value of $(y_i - y_1)/(y_2 - y_1)$ is stored in a lookup table, for example. These values, $(y_i - y_1)/(y_2 - y_1)$, are then scaled and offset for a particular luminance code in a region to obtain the modified gamma value.

As shown in FIG. 4B, the adjusted gamma value $y_f$ is determined by adding the gamma value offset 495 to the gamma value, $y_1'$, of the modified tap point 463B, in accordance with one embodiment of the present invention.

That is, to calculate $y_f$, the ratio of $(y_2' - y_1')/(y_2 - y_1)$ is applied to the voltage difference $(y_i - y_1)$, which is then added to $y_1'$ to determine the resulting gamma voltage. Because it is a ratio applied in a linear fashion, a smooth and continuous behavior is exhibited between and also at the tap points.

Figure 3:
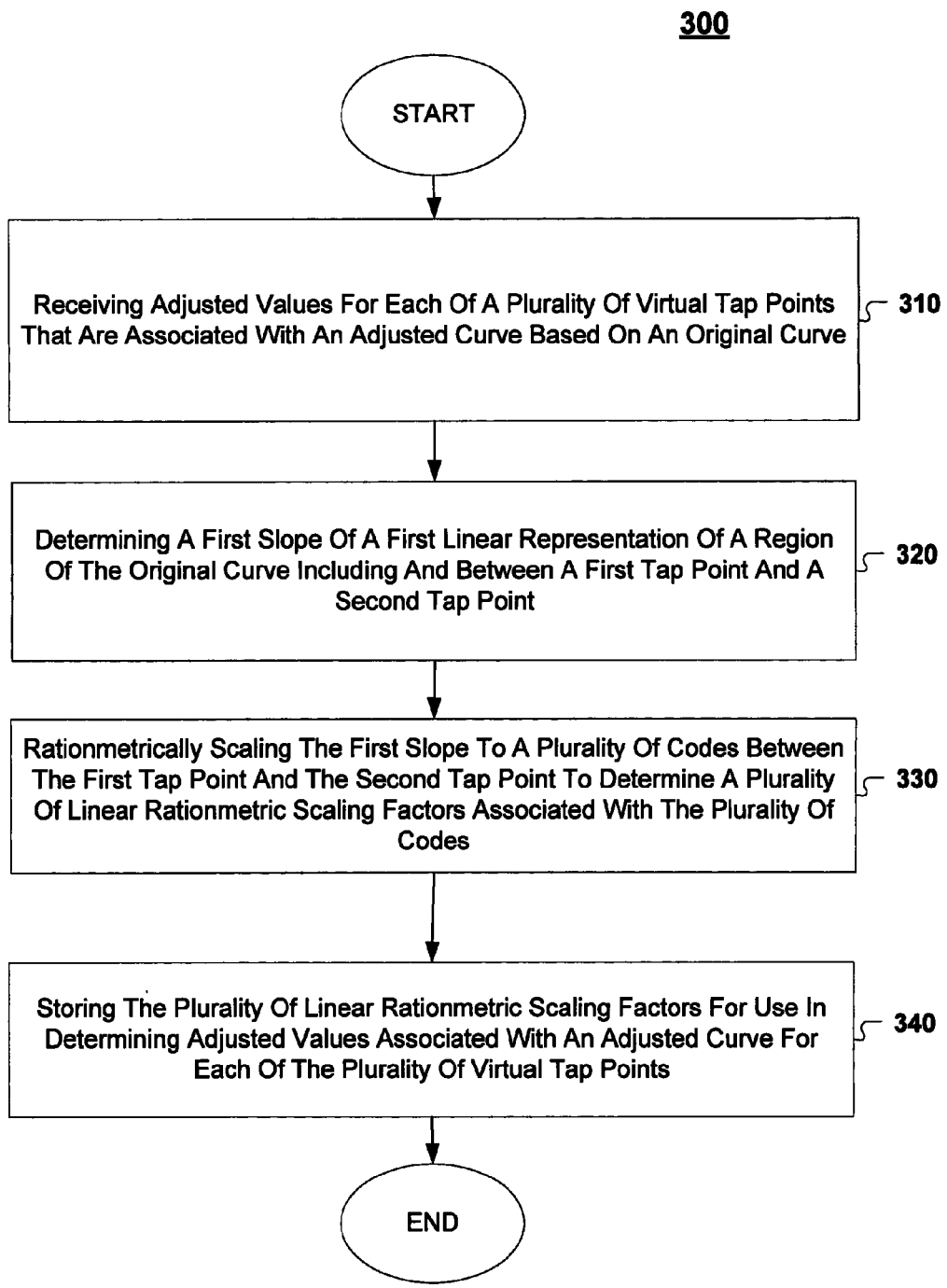
FIG. 3 is a flowchart illustrating steps in a method for digitally scaling a gamma curve in a linear and ratiometric fashion by generating a plurality of linear scaling factors for a plurality of luminance codes, in accordance with one embodiment of the present invention.

FIG. 3 is a flowchart 300 illustrating steps in a method for digitally scaling a generic, digitally represented curve in a linear and ratiometric fashion by generating a plurality of linear scaling factors for a plurality of horizontally represented codes, each associated with a value on the curve, in accordance with one embodiment of the present invention.

While the present embodiment is described in relation to generic, digitally represented curve, in one embodiment, the curve is an original gamma curve, in which a modified gamma curve translated from the original gamma curve performs contras enhancement on luminance codes of the original gamma curve.

At 310, the present embodiment receives modified tap points for each of a plurality of virtual tap points associated with an original curve. The modified tap points are associated with a modified curve that is based on the original curve. As such, the modified curve comprises the modified tap points.

At 320, the present embodiment determines a first slope of a first linear representation of a region in the original curve. In particular, the present embodiment determines a slope of the original curve in a region defined between a first virtual tap point and a second virtual tap point. The region includes the first virtual tap point and the second virtual tap point.

At 330, the present embodiment ratiometrically scales the first slope to a plurality of codes (e.g., luminance codes) between the first virtual tap point and the second virtual tap point. That is, the present embodiment determines a plurality of linear ratiometric scaling factors associated with the plurality of codes. The operation performed at 330 is analogous to the operation performed at 210 in FIG. 2, and illustrated in FIGS. 4A and 4B.

At 340, the present embodiment stores the plurality of linear ratiometric scaling factors for use in determining adjusted values for a plurality of codes. The adjusted values are associated with the modified curve.

In particular, the present embodiment is capable of determining adjusted values. Specifically, a second slope of a linear representation of the modified curve in the region is determined. That is, a slope is determined of the line between the modified tap point associated with the first virtual tap point and the modified tap point that is associated with the second virtual tap point, wherein the first and second virtual tap points are located on the original curve.

The present embodiment applies a corresponding linear ratiometric scaling factor to the second slope to determine a value offset for a code in the region. As such, an adjusted value is determined for the code based on the value offset. In one embodiment, the adjusted value is determined by adding the value offset to the first virtual tap point.

Embodiments of the present invention have been presented for performing the digital scaling of a gamma curve. In addition, other embodiment of the present invention are well suited to performing digital scaling of any type of curve, such that these embodiments are capable of preserving the shape of the translated, original waveform. For example, these embodiments are applied to perform transformations of original waveforms that exhibit characteristics that include, but are not limited to, non-monotonic waveforms, monotonic waveforms, etc.

In another embodiment of the present invention, the computations performed in generating the linear ratiometric scaling factors are determined from 12 bit values. That is, the gamma values for the plurality of virtual tap points are represented by 12 bit values. In addition, the resulting adjusted gamma values in the modified curve are also represented by 12 bit values. However, the plurality of linear ratiometric scaling factors are stored as 10 bit values, in accordance with one embodiment of the present invention.

This is possible, since the computation for $[(y_i-y_1)/(y_2-y_1)]$ in Equation (5) results in a value between 0 and 1. This computation is performed using floating point precision, in one embodiment. While the resulting adjusted or modified gamma values are 12-bit, the linear scaling factors programmed in the look up tables can use fewer bits, since the values will range from 0 to full scale between each tap point. As such, each of the linear scaling factors can be pre-calculated using floating-point precision, thereby limiting quantization error due to round-off errors. Additionally, storing the linear ratiometric scaling factor as 10 bit values minimizes storage requirements for the non-volatile memory used to store the 10 bit linear ratiometric scaling factors.

In the present embodiment, the gamma values in ratiometric form are selected to be 10 bits of resolution. In other embodiments, this value could be lowered if less precision is required between tap points. Thus, in one embodiment the linear ratiometric scaling factor is scaled-up by a factor, $2^{10}$, as follows: $[(yi-y1)/(y2-y1)]*2^{10}$. As such, the linear ratiometric scaling factors are calculated with 10 bits of precision. Thus, after the multiply by $(y2'-y1')$ is performed, a right-shift by 10 and rounding must be performed in the interpolator, as follows in Equation 6:

$$y_f = \text{round}\{[2^{10}(y_i-y_1)/(y_2-y_1)]*(y2'-y_1')/2^{10}\}+y_1' \quad (6)$$

In another embodiment, the original gamma values associated with the original gamma curve 410A in the region 470 can be calculated. Although the look up tables for each of the luminance codes in a region 470 store corresponding linear ratiometric scaling factors, the original gamma values are recovered by using the y values extracted from the gamma tables in Equation (7), as follows:

$$y_f = \text{round}\{[2^{10}(y_f-y_1)/(y_2-y_1)]*(y_2-y_1)/2^{10}\}+y1 \quad (7)$$
$$= yi$$

Essentially, the present embodiment sets $y_2=y_2'$ and $y_1=y_1'$ in Equation 6. That is, a gamma value of the original gamma curve is extracted by determining a gamma value offset for a luminance code by applying the corresponding linear ratiometric scaling factor to the linear representation of the original gamma curve in the region 470. Thereafter, the original gamma value is calculated based on the determined gamma value offset.

As such, Equation 7 demonstrates the ability to recover the original gamma value from the ratiometric-formatted data with very little loss due to quantization error, since the computations are done with floating-point precision, in one embodiment.

Manipulation of Accuracy and Resolution of a Given Waveform

In accordance with other embodiments of the present invention, the amount of available resolution is manipulated in various parts of the gamma curve. This is accomplished by locating virtual tap points in a strategic fashion. Specifically, embodiments of the present invention are able to trade-off the available accuracy and resolution used in various parts of the gamma curve by adjusting either or both the strategic placement of the virtual tap points, as well as changing the scaling factors to adjust the accuracy and/or resolution of the resulting digitized voltage code in one or more regions of the gamma curve.

In particular, if $y_1'=y_1$ and $y_2'=y_2$ (i.e., a digital system where the tap points are not being translated vertically for contrast enhancement), then embodiments of the present invention can be used in the general case of any digital gamma. That is, accuracy and resolution are manipulated in a digital curve without providing any vertical translation.

In one embodiment, since the linear ratiometric scaling factor is calculated to 10 bits of resolution between each of the virtual tap points, there are effectively $2^{10}$ steps between the virtual tap points. As such, virtual tap points can be strategically placed closer together along the horizontal axis representing luminance (e.g., FIG. 4A) in the areas of the gamma curve requiring more accuracy. Also, virtual tap points can be placed further apart along the horizontal axis in areas of the gamma curve that do not require as much accuracy. This enhances the monotonic increase of the gamma values in the gamma curve.

Figure 6A:
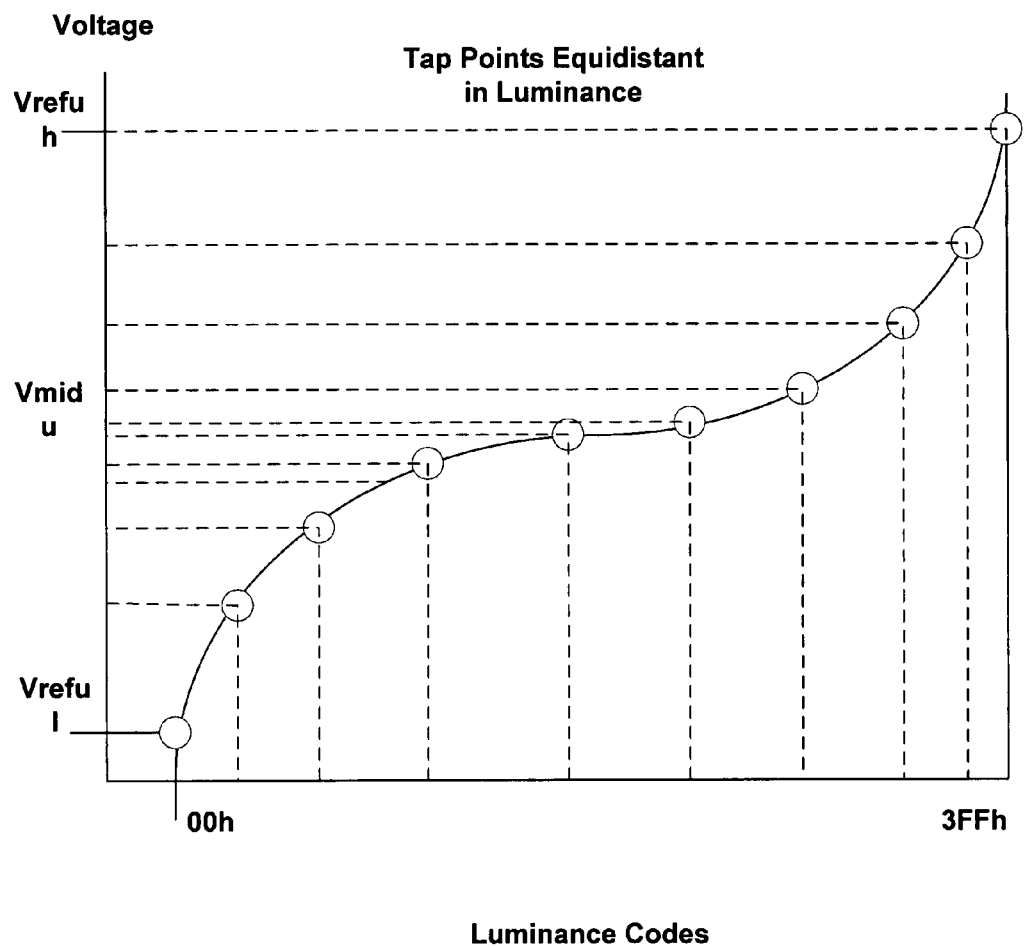
FIG. 6A is a graph illustrating the placement of virtual tap points showing the enhancement of accuracy at the cost of resolution, in accordance with one embodiment of the present invention.

FIGS. 6A and 7A illustrate two embodiments in which the virtual tap points are strategically placed to enhance accuracy and resolution. Other placement arrangements of the virtual tap points are possible in other embodiments of the present invention. For instance, in one embodiment, the plurality of virtual tap points is defined such that the number of luminance codes between virtual tap points is not constant. As such, each of the plurality of virtual tap points is not equidistant from each other. In another embodiment, the plurality of virtual tap points is defined such that the number of luminance codes is constant. As such, each of the plurality of virtual tap points is equidistant from each other.

FIG. 6A is a graph 600A showing the enhancement of accuracy, possibly at the cost of resolution, in accordance with one embodiment of the present invention. That is, the present embodiment defines the plurality of virtual tap points such that the number of luminance codes between tap points is constant.

In FIG. 6A, if the tap points are placed equidistant in luminance (x-axis), then in the flat regions of the curve (i.e., where there is less delta-voltage range between two virtual tap points), accuracy is enhanced, in accordance with one embodiment of the present invention. This is because the $2^{10}$ dynamic range of the scale factor spans a smaller dynamic voltage range. For example, since the linear ratiometric scaling factor is calculated to 10 bits of resolution between each of the virtual tap points, there are effectively $2^{10}$ steps between the virtual tap points. As such, in relatively flat portions of the gamma curves, more tap points can be effectively placed to provide increased resolution in those regions. This results in placement of the voltage values that are more exact, and more resolvable. This enhances the monotonic increase of the gamma values in the modified gamma curve.

Figure 6B:
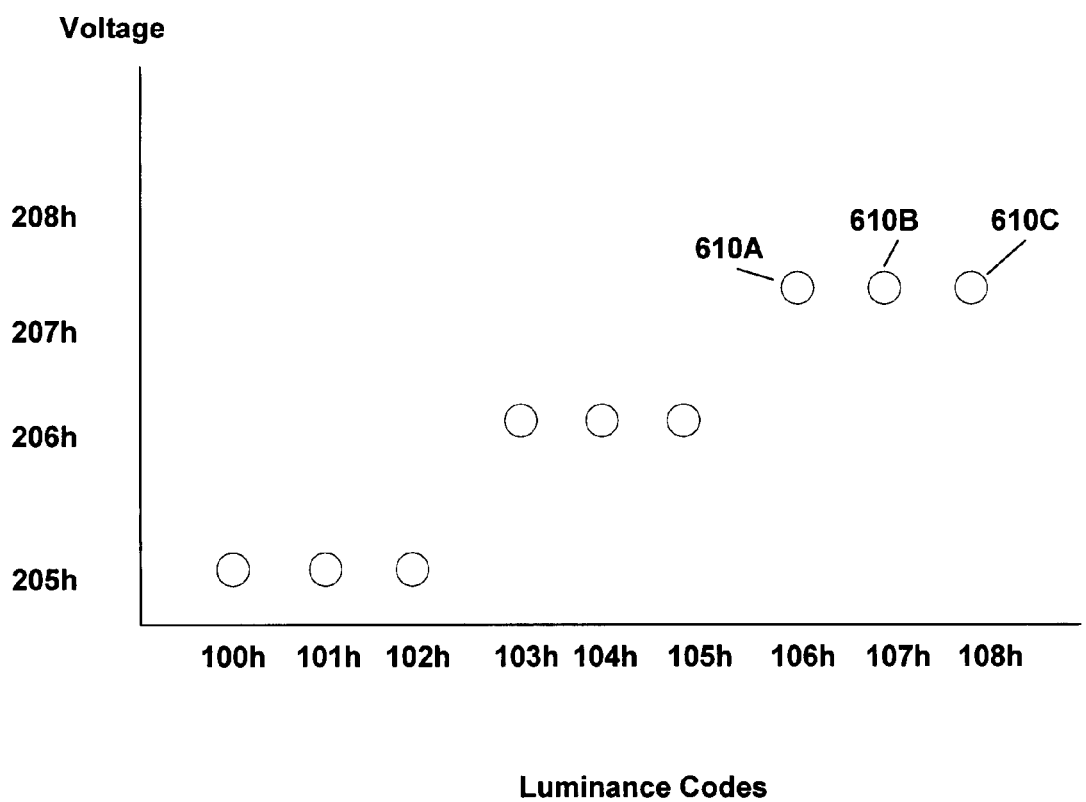
FIG. 6B is a graph illustrating the redundancy introduced when limited by resolution in a gamma curve, in accordance with one embodiment of the present invention.

On the other hand, the resolution may limit the accuracy. That is, if the resolution (i.e., the number of bits used to represent the voltage value) is not sufficient, then repeated voltage values for a series of luminance values can result, as is shown in FIG. 6B. Specifically, FIG. 6B is a graph illustrating points along a gamma curve in which the resolution of the calculated points limits their accuracy. For instance, points 610A, 610B, and 610C each have identical gamma values that are repeated on the gamma curve for different luminance codes. However, since the gamma curve is monotonic, the gamma values for 610A, 610B, and 610C should be unique as they increase from 610A to 610C. As such, the resolution of the calculated gamma values for points 610A, 610B, and 610C is limited when the delta voltage range between virtual tap points including points 610A, 610B, and 610C is too small.

In one embodiment of the present invention, more bits of resolution can be provided by changing the scale-down factor and multiplying up the $y_1'$ offset, as shown in equation 8.

$$y_i=\text{round}\{[2^{10}(y_i-y_1)/(y_2-y_1)]*(y_2-y_1)/2^8\}+4y_1 \tag{8}$$

Specifically, the $(y_i-y_1)/(y_2-y_1)$ value is originally scaled up by a $2^{10}$ factor. However, instead of scaling back down by the $2^{10}$ factor, the present embodiment scales back down by a $2^8$ factor. This effectively gains two bits of resolution. That is, resolution is increased by a $2^2$ factor, which gives an increase of 4 times for the resolution. As such, gamma values for points 610A, 610B, and 610C would have enough resolution so that they are unique, thereby again exhibiting monotonic characteristics.

The effect presented in FIGS. 6A and 6B is that more bits of resolution can be provided in certain regions of the gamma curve to match the desired level of accuracy (in terms of dynamic voltage range).

Figure 7:
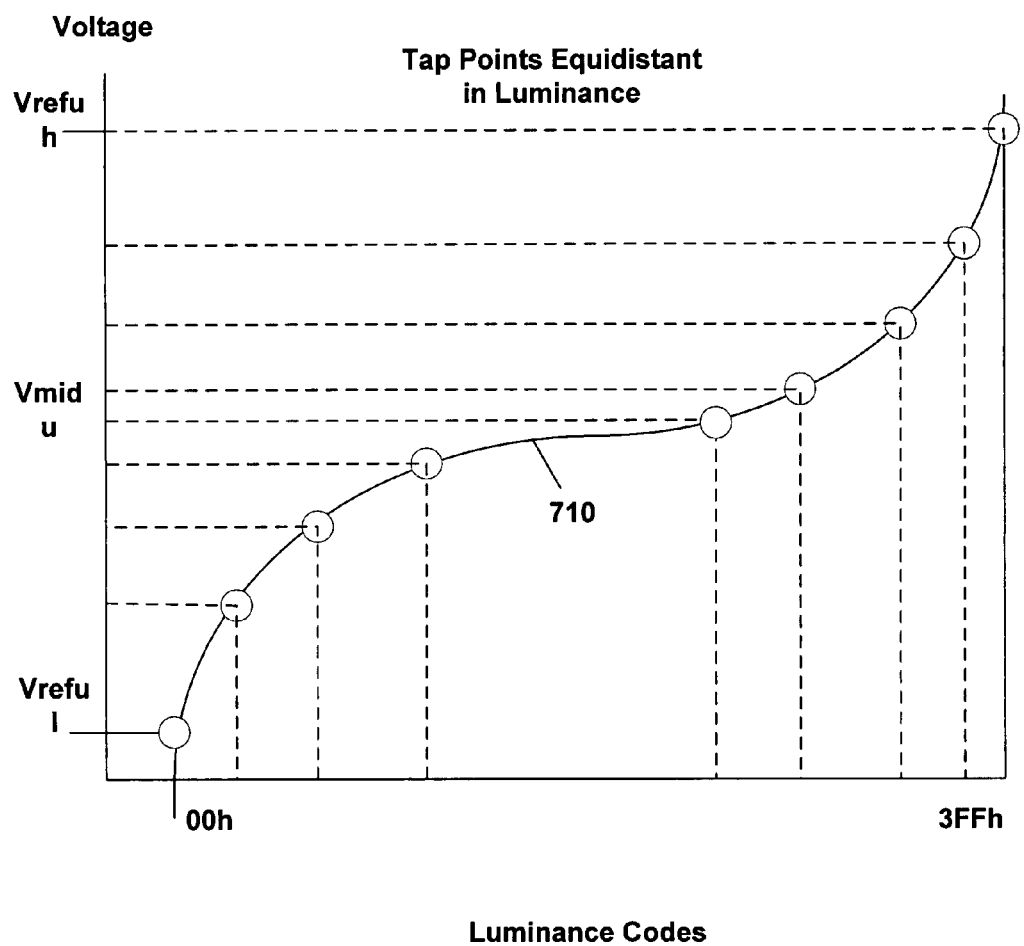
FIG. 7 is a graph illustrating the placement of virtual tap points showing the enhancement of resolution at the cost of accuracy, in accordance with one embodiment of the present invention.

FIG. 7 is a graph 700 showing the enhancement of resolution at the cost of accuracy, in accordance with one embodiment of the present invention. That is, the present embodiment is able to take full advantage of the available resolution throughout a gamma curve. For example, the present embodiment defines the plurality of virtual tap points such that the number of luminance codes between tap points is not constant.

In one embodiment, if it is more desirable to keep the level of accuracy constant across all regions of the curve, then the tap points can be placed such that they are equidistant in voltage instead of luminance, as shown in FIG. 7.

In another embodiment, if it is acceptable to reduce the level of accuracy across the entire curve in an effort to lower the scaling factor's resolution (and thus the size of the on-chip memories required to store the look-up tables), then the values of the scale-up/scale-down factors can be reduced, which requires that 8-bit LUT values (as an example) be stored instead of 10-bit LUT values (with the tap points still being 12-bit, and with the resulting gamma voltage values also being 12-bit), as shown in equation 9.

$$y_i=\text{round}\{[2^8(y_i-y_1)/(y_2-y_1)]*(y_2-y_1)/2^8\}+y_1 \tag{9}$$

As such, in embodiments of the present invention, the resolution can be placed where there is more need and conserved where there is less need. This leads to a higher quality (e.g., higher resolution) visual display device.

In still other embodiments, a combination of the techniques as shown in FIGS. 6A and 7 can be used to achieve the desired accuracy and resolution in selected areas of the gamma curve. For example, in low slope areas of the gamma curve, the distance between virtual tap points can be reduced, and in higher slope area of the gamma curve, the distance between virtual tap points can be increased.

Accordingly, various embodiments of the present invention disclose a system and method for scaling a gamma curve in a linear and ratiometric fashion. Embodiments of the present invention allow the translation of an original gamma curve to a modified gamma curve enhanced for some purpose such as contrast enhancement in a smooth, continuous, and monotonic fashion through the use of a linear ratiometric scaling calculation. This is done to provide a digital scaling method that is equivalent to the voltage tap-based resistor ladder digital-to-analog gamma conversion circuit. Furthermore, embodiments of the president invention also allow for the pre-calculation of values to minimize quantization errors and storage size requirements in a non-volatile memory used to store table values. In addition, embodiments of the present invention also provide for a mechanism by which accuracy and/or resolution can be manipulated in specific regions of the gamma curve by strategically locating tap points on the gamma curve, or by adjusting the scaling factors applied to the calculations, to meet the requirements of the display system.

Embodiments of the present invention, a method and system for scaling an original gamma curve in a linear and ratiometric fashion are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed is:

1. A method of digitally adjusting a gamma curve of a display device, the method comprising:
   for a luminance code in a region located between and including a first tap point and a second tap point of a plurality of virtual tap points associated with luminance codes for an original gamma curve of a controller for said display device, determining a linear scaling factor for said luminance code based on a linear representation of said original gamma curve in said region, wherein a voltage output for said luminance code is presented to said display device by said controller;
   determining a gamma value offset for said luminance code by applying said linear scaling factor to a linear representation of a modified gamma curve in said region performing contrast enhancement;
   determining an adjusted gamma value for said luminance code based on said gamma value offset, wherein said adjusted gamma value is associated with said modified gamma curve for said controller of said display device, and wherein said voltage output is adjusted as determined by said adjusted gamma value for said luminance code.

2. The method of claim 1, wherein said defining a plurality of virtual tap points comprises:
   spacing each of said plurality of virtual tap points equidistant in luminance from each other.

3. The method of claim 1, wherein said defining a plurality of virtual tap points comprises:
   spacing each of said plurality of virtual tap points equidistant in voltage from each other.

4. The method of claim 1, wherein said determining a linear ratiometric scaling factor comprises:
   determining said linear representation of said original gamma curve between said first tap point and a second tap point;
   ratiometrically scaling a slope of said linear representation of said original gamma curve in said region to said luminance code to determine said linear ratiometric scaling factor.

5. The method of claim 1, wherein said determining a gamma value offset comprises:
   determining said linear representation of said modified gamma curve between a first modified tap point associated with said first tap point and a second modified tap point for said second tap point; and
   applying said ratiometric scaling factor to a slope of said linear representation of the said modified gamma curve in said region to determine said gamma value offset.

6. The method of claim 1, wherein said determining an adjusted gamma value comprises:
   adding said gamma value offset to a modified tap point on said modified gamma curve for said first tap point.

7. The method of claim 1, further comprising:
   determining a plurality of linear ratiometric scaling factors for luminance codes in said region of said original gamma curve; and
   storing said plurality of linear ratiometric scaling factors as 10 bit values, wherein said adjusted gamma values in said gamma curve are represented by 12 bit values.

8. A method of digitally adjusting a curve of a display device, the method comprising:
   receiving adjusted tap points for each of a plurality of virtual tap points that are associated with a modified curve based on an original curve of a controller for said display device;
   determining a first slope of a first linear representation of a region of said original curve including and between a first tap point and a second tap point;
   ratiometrically scaling said first slope to a plurality of codes between said first tap point and said second tap point to determine a plurality of linear ratiometric scaling factors associated with said plurality of codes, wherein a voltage output for each said code is presented to said display device by said controller;
   storing said plurality of linear ratiometric scaling factors for use in determining adjusted values associated with a modified curve for each of said plurality of codes for said controller of said display device, and wherein said voltage output is adjusted as determined by said modified curve for each said code.

9. The method of claim 8, wherein said curve comprises a monotonic gamma curve, and wherein said plurality of codes comprise a plurality of luminance codes.

10. The method of claim 8, wherein said determining a first slope comprises:
    determining said first slope of said region for said original curve between said first tap point and said second tap point.

11. The method of claim 8, further comprising:
    determining a second slope of a second linear representation of said region for said modified curve between a first modified tap point associated with said first tap point and a second modified tap point associated with said second tap point;
    applying said linear ratiometric scaling factor to said second slope to determine a value offset for a code in said region; and
    determining an adjusted value for said code based on said value offset that is associated with said modified curve.

12. The method of claim 11, wherein said determining an adjusted value comprises:
    adding said value offset to said first tap point.

13. The method of claim 9, further comprising:
    spacing each of said plurality of virtual tap points equidistant in luminance codes from each other.

14. The method of claim 9, further comprising:
    spacing each of said plurality of virtual tap points equidistant in voltage from each other.

15. The method of claim 8, further comprising:
extracting a value of the said original curve by determining a value offset for a code by applying said linear ratiometric scaling factor to said first linear representation; and
determining said value based on said value offset.

16. A system for digitally adjusting a gamma curve, comprising:
a scaling module for ratiometrically scaling a first slope of a first linear representation of a region between tap points of an original gamma curve to determine a plurality of linear ratiometric scaling factors associated with a plurality of luminance codes in said region, wherein said original gamma curve comprises a plurality of defined virtual tap points associated with luminance codes; and
a storage module for storing said plurality of linear ratiometric scaling factors that are used in determining adjusted gamma values associated with a modified gamma curve for each of said plurality of luminance codes in said region.

17. The system of claim 16, further comprising:
a contrast compensation module for determining modified tap points for each of said virtual tap points of a modified gamma curve performing contrast enhancement; and
an offset module for determining a gamma value offset for a luminance code in said region by applying a corresponding linear scaling factor to a linear representation of said modified gamma curve including and between said first tap point and said second tap point.

18. The system of claim 17, wherein said offset module determines an adjusted gamma value for said luminance code based on said gamma value offset.

19. The system of claim 16, wherein said storage module stores said plurality of linear ratiometric scaling factors as 10 bit values, and wherein said adjusted gamma values in said gamma curve are represented by 12 bit values.

20. A method of adjusting a curve of a display device, the method comprising:
digitally adjusting spacing between each of a plurality of virtual tap points associated with an original curve of a controller for said display device, wherein said original curve comprises a plurality of luminance codes, and wherein a voltage output for each said luminance code is presented to said display device by said controller, and wherein each said voltage output is adjusted as determined by a modified curve for said codes.

21. The method of claim 20, wherein said curve comprises a gamma curve, and wherein said digitally adjusting comprises:
spacing each of said plurality of virtual tap points equidistant in luminance from each other.

22. The method of claim 20, wherein said curve comprises a gamma curve, and wherein said digitally adjusting comprises:
spacing each of said plurality of virtual tap points equidistant in voltage from each other.

23. The method of claim 20, further comprising:
receiving adjusted tap points for each of said plurality of virtual tap points that are associated with a modified curve performing contrast enhancement on said luminance codes of said original curve;
determining a first slope of a first linear representation of a region of said original curve including and between a first tap point and a second tap point;
ratiometrically scaling said first slope to a plurality of codes between said first tap point and said second tap point to determine a plurality of linear ratiometric scaling factors associated with said plurality of codes;
storing said plurality of linear ratiometric scaling factors for use in determining adjusted values associated with a modified curve for each of said plurality of codes.

24. The method of claim 23, further comprising:
determining a second slope of a second linear representation of said region for said modified curve between a first modified tap point associated with said first tap point and a second modified tap point associated with said second tap point;
applying said linear ratiometric scaling factor to said second slope to determine a value offset for a code in said region; and
determining an adjusted value for said code by adding said value offset to said first tap point.

* * * * *